United States Patent [19]

Lück

[11] Patent Number: 4,697,963

[45] Date of Patent: Oct. 6, 1987

[54] INSERT CLAMPING DEVICE AND INSERT THEREFOR

[75] Inventor: Edwin Lück, Mudersbach, Fed. Rep. of Germany

[73] Assignee: Ingersoll Cutting Tool Company, Rockford, Ill.

[21] Appl. No.: 822,738

[22] Filed: Jan. 27, 1986

[30] Foreign Application Priority Data

Feb. 8, 1985 [DE] Fed. Rep. of Germany ... 8503545[U]
Jun. 4, 1985 [DE] Fed. Rep. of Germany ... 8527924[U]

[51] Int. Cl.⁴ .............................................. B23C 5/22
[52] U.S. Cl. .................................... 407/105; 407/31; 407/48; 407/50; 407/109; 407/111; 407/113
[58] Field of Search .................... 407/31, 40, 47, 48, 407/50, 103, 104, 105, 109, 111, 112, 113

[56] References Cited

U.S. PATENT DOCUMENTS

| | | |
|---|---|---|
| 936,793 | 11/1909 | Middleton . |
| 1,538,929 | 5/1925 | De Vlieg . |
| 3,061,910 | 11/1962 | Chamberlain . |
| 3,156,031 | 11/1964 | Lundgren .............................. 407/109 |
| 3,500,522 | 3/1970 | Stier ...................................... 407/111 |
| 3,708,843 | 1/1973 | Erkfritz ................................. 407/113 |
| 3,754,309 | 8/1973 | Jones et al. . |
| 3,816,893 | 6/1974 | Farrow . |
| 3,831,237 | 8/1974 | Gunsalus . |
| 3,837,058 | 9/1974 | Barkley et al. ....................... 407/109 |
| 3,887,975 | 6/1975 | Sorice et al. . |
| 3,934,320 | 1/1976 | McCreery . |
| 3,940,835 | 3/1976 | Friedline et al. . |
| 3,996,651 | 12/1976 | Heaton et al. ....................... 407/104 |
| 4,400,117 | 8/1983 | Smith . |
| 4,422,812 | 12/1983 | Linville . |
| 4,477,212 | 10/1984 | Kraft .................................... 407/104 |

FOREIGN PATENT DOCUMENTS

| | | |
|---|---|---|
| 2315044 | 10/1974 | Fed. Rep. of Germany . |
| 2628624 | 12/1977 | Fed. Rep. of Germany . |
| 2711006 | 9/1978 | Fed. Rep. of Germany ........ 407/48 |
| 2758344 | 7/1979 | Fed. Rep. of Germany ...... 407/111 |
| 8011211 | 4/1980 | Fed. Rep. of Germany . |
| 2347135 | 11/1977 | France ................................. 407/111 |
| 1088465 | 10/1967 | United Kingdom ................ 407/104 |
| 1254578 | 11/1971 | United Kingdom . |
| 878422 | 11/1981 | U.S.S.R. .............................. 407/109 |

OTHER PUBLICATIONS

Sandvik Marketing Memo 84-9, issued Jul. 2, 1984, p. 2.
Sitzmann and Heinlein, Slotcut TF, 1981 catalog.

Primary Examiner—Nicholas P. Godici
Assistant Examiner—Jerry Kearns
Attorney, Agent, or Firm—Fitch, Even, Tabin & Flannery

[57] ABSTRACT

The clamping mechanism and companion cutting insert disclosed are designed for use in a milling cutter intended to be ganged with other like cutters on a common rotational axis for the simultaneous milling of multiple slots or grooves. The axially movable clamp for the on-edge inserts employed in the cutter is operated indirectly by an adjusting screw accessible radially from the outside of the ganged cutter bodies without requiring disassembly of the individual cutters to index or replace the cutting inserts. In each of several clamping mechanisms disclosed, the ultimate clamping element or detent takes the form of an arm which is rocked into engagement with the insert at the site of a blind depression in the face of the insert, being drawn in the axial direction by inward adjustment of a radially accessible adjusting screw, and rockable in the reverse direction by a return spring to release the insert as the adjusting screw is backed off.

The relatively thin inserts for the described service do not have the usual through hole typically found in on-edge inserts, but are provided instead with blind depressions in their major surfaces while the clamping arm is formed cooperatively with the insert depression to provide axial clamping force with a radially inwardly directed component.

18 Claims, 22 Drawing Figures

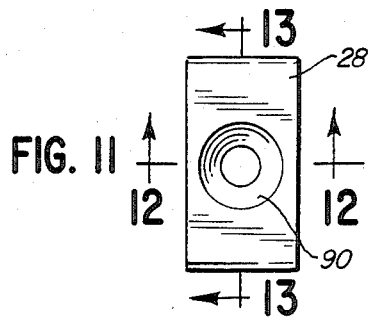
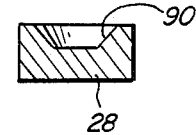
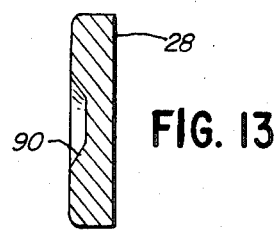
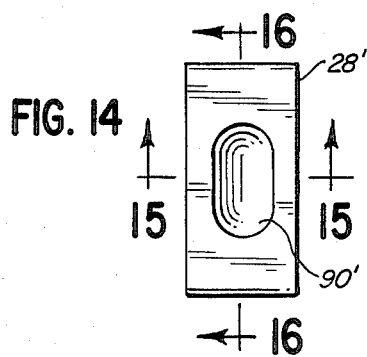
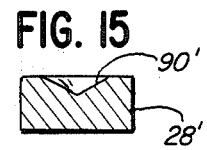
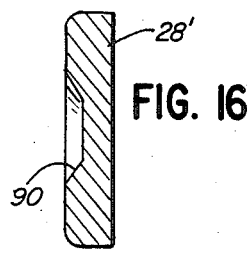
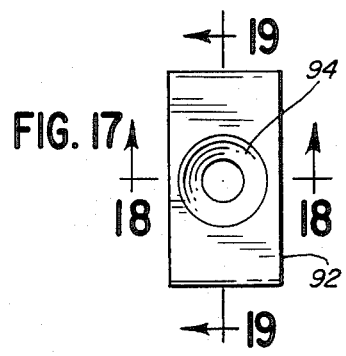
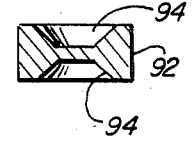
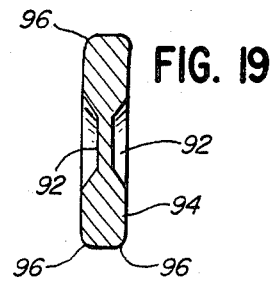
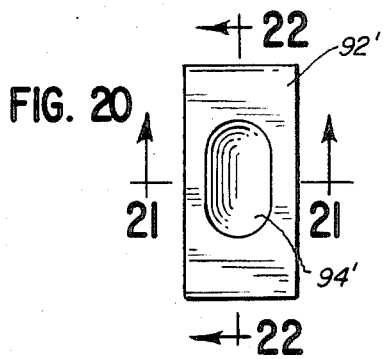
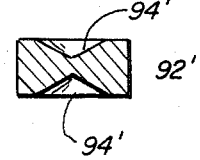
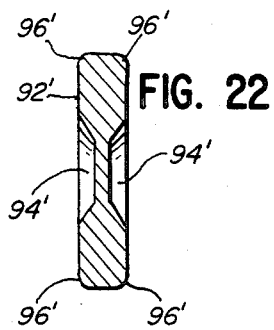

INSERT CLAMPING DEVICE AND INSERT THEREFOR

This invention relates to a clamping mechanism for the replaceable and indexable cutting inserts of a milling cutter designed for the simultaneous milling of multiple grooves or slots, and to a form of cutting insert especially adapted for such service in combination with the novel clamping mechanism of the invention.

BACKGROUND OF THE INVENTION

The superiority of the so-called "on edge" type of cutting insert of tungsten carbide or the like is now widely recognized, with inserts of that type being secured in pockets milled in the bodies of the host milling cutters by a countersink head retaining screw passed through a countersunk hole extending between the major faces of the insert, and into a tapped hole in the cutter body.

For the type of service to which this invention is particularly directed, namely a gang slot mill for the simultaneous milling of multiple and relatively narrow slots or grooves in a workpiece, the customary retaining screw, positioned parallel to the cutter axis, and passed through a hole in the more or less radially upstanding insert, is not satisfactory because the hole for the retainer screw in an insert of the thinness required for this service does not leave sufficient cross-sectional area to resist the stresses encountered in the intended service, the thickness of the cutter body at the site of the retaining screw does not provide sufficient thread depth to anchor an insert securely after repeated adjustment, and because access to axis-parallel retaining screws in ganged slot cutters for the indexing and replacement of the cutting inserts is not feasible without disassembling the cutters from the common arbor or the like upon which they are assembled.

SUMMARY OF THE INVENTION

The noted draw backs of accustomed on-edge insert clamping techniques are overcome by the indirectly operated insert clamping mechanism of the invention, which is housed within the thicker, radially-inward base portion of the cutter body but is nevertheless effective to solidly clamp and retain the inserts of a narrow slotting mill while remaining accessible radially of the cutter to allow for the indexing or replacing of inserts without disassembly of a gang of such cutters from their arbor.

The invention further provides a form of cutting insert without cored holes which is especially designed for use in the described service in combination with the insert clamping mechanism of the invention.

BRIEF DESCRIPTION OF THE DRAWINGS

The invention in preferred and alternate forms is described in the following specification by reference to the attached drawings, of which:

FIG. 11 is an elevational view of one form of roughing insert of the invention intended for roughing, viz., that seen in FIGS. 2, 4, 5, and 6;

FIG. 12 and 13 are sectional views through the transverse and longitudinal central planes, respectively, of the insert of FIG. 11;

FIG. 14 is an elevational view of a modified form of the roughing insert of FIGS. 11 to 13; while FIGS. 15 and 16 are sectional views of the same taken on the transverse and longitudinal central planes, respectively, of the insert of FIG. 14.

FIG. 17 is an elevational view of an eight-edged finishing insert having a conical clamping depression in each of its major faces; while FIGS. 18 and 19 are sectional views of the same taken on transverse and longitudinal planes of the insert of FIG. 17;

FIG. 20 is an elevational view of a modified form of a finishing insert similar to that of the roughing insert of FIG. 11; while FIGS. 21 and 22 are sectional views of the same taken on the transverse and longitudinal planes, respectively, of the insert of FIG. 20.

DETAILED DESCRIPTION OF THE INVENTION

Figure 1:
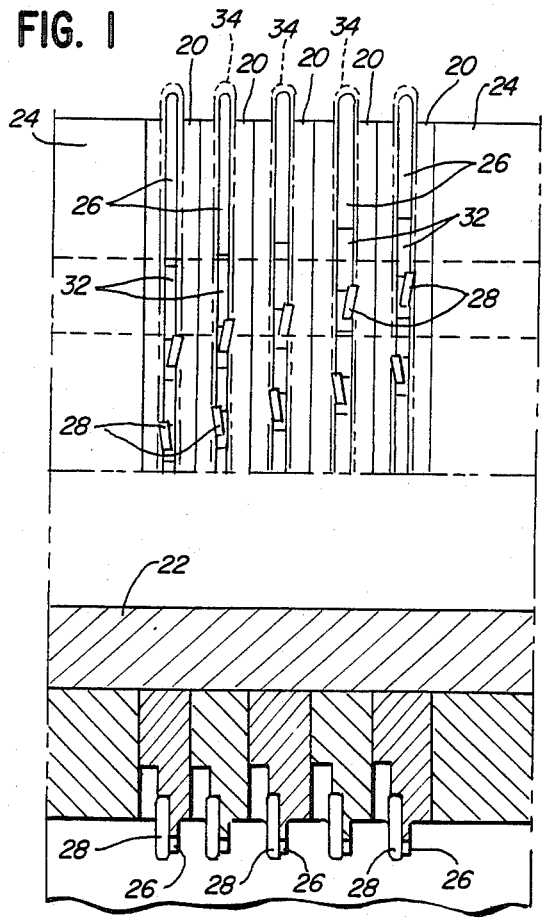
FIG. 1 is an elevational view, partly in section, of a series of individual slot cutters in ganged assembly upon a common drum arbor for the milling of multiple narrow slots in a workpiece.

Referring to FIG. 1, a group of five disk-like slot cutters 20 of the kind to which the invention is applied are ganged together in side-by-side relation on a common drum-shaped arbor 22, upon which they may be separated from other gangs of similar cutters (not shown) by group-flanking spacing collars 24. Each of the disk-like bodies of the individual cutters 20 has a central opening sized for slip fit onto the arbor 22, to which each cutter body is secured for rotation by an elongated key which is not shown, and the assembly thereafter positioned and clamped axially of the arbor by means also not shown.

A central ridge 26 on the periphery of each cutter body provides radially extended support for multiple, circumferentially aligned inserts 28 which are seated in pockets 30 milled in the ridge 26 and extending radially inwardly into the thicker base portion of the cutter body. In front of each insert in the cutting direction of rotation, the ridge 26 is cut away in a scallop which provides a chip gullet 32 in front of the rake face of each insert.

In accordance with accepted milling practice, corresponding cutting inserts are circumferentially staggered from cutter to cutter to spread the effect of the separate impacts of the cutting inserts upon the workpiece, and the cutting inserts 28 of a given cutter disk alternate from one side of the ridge 26 to the other so that their effective combined cutting paths 34 are the envelopes of both left and right side inserts, as indicated by the broken lines surrounding the thin peripheral ridge of each cutter disk as a radial sectional view of the cutting path in the upper portion of FIG. 1.

In the lower, sectioned portion of FIG. 1, a series of left side cutting inserts of each of the cutter bodies is projected circumferentially to the plane of the drawing to illustrate the limited space available for releasably clamping the thin on-edge inserts in a cutter body designed for milling narrow slots.

Figure 2:
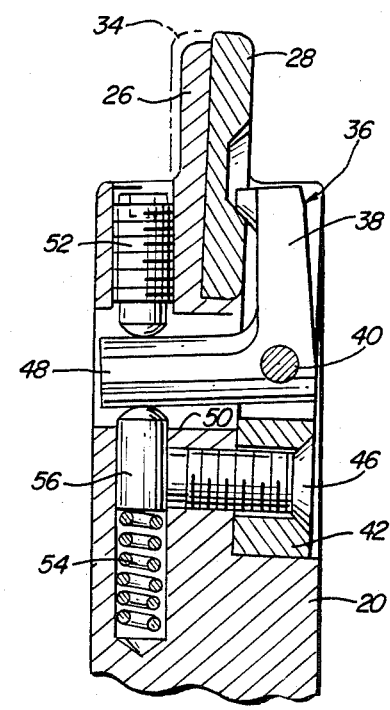
FIG. 2 is an enlarged fragmentary sectional elevation of a single one of the disk-shaped slot cutters removed from the ganged assembly, and showing one form of the clamping mechanism of the invention engaged with one form of insert especially designed for the described service.

The enlarged sectional elevation of FIG. 2, taken on the central longitudinal plane of the insert 28, illustrates the initially developed form of the clamping mechanism 36 of the present invention for securing the insert in its pocket 30. It comprises a clamping detent 38 formed as one arm of a bell crank lever positioned approximately radially of the cutter body, and pivoted on a cross pin 40 in a U-shaped supporting frame 42 seated in a slot 44 milled approximately radially of the cutter body on one of its faces.

The supporting frame 42 is secured in its host slot by a countersink head retaining screw 46, and the second arm 48 of the bell crank clamping detent extends through a clearance hole 50 in the cutter body parallel to the rotational axis of the cutter. The clearance hole is sized in relation to the arm 48 to permit sufficient radial travel of the arm to disengage the detent 38 from the insert 28 with clearance adequate for removal of the insert from its pocket 30, while the detent 38 is itself dimensioned to clear the insert 28 when the detent is backed against the adjacent cutter body, i.e., flush with the right hand face of the cutter body 20 in FIG. 2.

The detent 38 is clamped to the insert by a headless dome-pointed socket screw 52 in a tapped hole extending approximately radially into the cutter body alongside the ridge 34 opposite the detent 38 so as to intercept the axially extending arm 48 of the bell crank. As indicated in FIG. 2, the hole which is tapped for the receipt of the headless adjusting screw 52 is extended radially inwardly into the cutter body sufficiently beyond the clearance hole 50 to receive a compression spring 54 and a slide pin 56 with a domed top which bears against the underside of the arm 48 in opposition to the adjusting screw 52. Thus, when the screw 52 is turned inwardly to rock the detent 38 into clamping engagement with the insert, the spring-loaded slide pin 56 recedes accordingly, and as the adjusting screw is backed off, the spring-driven slide pin rocks the arm 48 radially outwardly to disengage the detent 38 from the insert to permit the insert to be lifted radially, free of its pocket, for indexing or replacement.

No part of the clamping mechanism 36 extends radially outwardly from the base portion of the cutter body 20, all engagement with the insert taking place within the confines of the base portion, although the cutting insert itself extends outwardly beyond the periphery of the ridge 26.

The insert 28 itself is a thin, elongated rectangular block having on one side thereof a blind conical depression to receive the conformably shaped nose of the clamping detent 38. As pressure is applied to the insert by the engagement of the nose of the detent, the axially- and radially-inwardly directed clamping force seats the insert firmly in its pocket 30.

Figure 4:
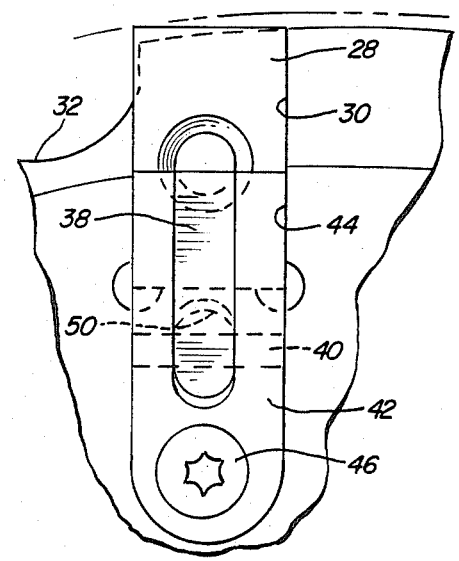
FIG. 4 is a side elevation of the insert and clamping device of FIG. 2.
Figure 3:
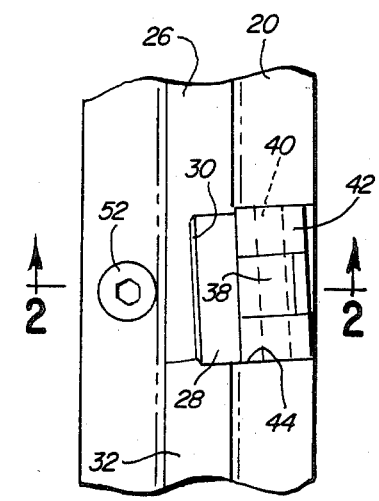
FIG. 3 is a plan view of the insert and clamping arrangement of FIG. 2.

The orientation of the insert to itself, and thus of the seating and locating surfaces of the pocket 30 which receives it, may be noted from FIGS. 2, 3, and 4.

Referring to FIGS. 2 and 3, it will be seen that the insert 28 is tilted on both its transverse and longitudinal axes with respect to a radial plane in order to provide side clearance (FIG. 2), and from FIG. 4 it will be seen that the rake face of the insert adjacent the chip gullet 32 is radially negative, i.e., positioned forwardly of a parallel radius, to provide tip clearance for the rectangular insert, the opposite radially outer corner of which is fully supported by the rear locator surface of the insert pocket 30 along which the cutter body receives the principal cutting load from the insert.

Equally apparent from FIGS. 2, 3, and 4 is that the alignment of the insert clamping mechanism is angularly displaced from radial alignment (FIG. 4) and from the radial plane (FIGS. 2 and 3) conformably with the insert itself so as to allow the detent to bear squarely upon the insert in the pocket, as well as for the sake of manufacturing convenience in the milling of the insert pocket 30 and of the merging, shallower host slot 44 which receives the U-shaped supporting frame 42 of the detent.

PREFERRED FORM

Figure 9:
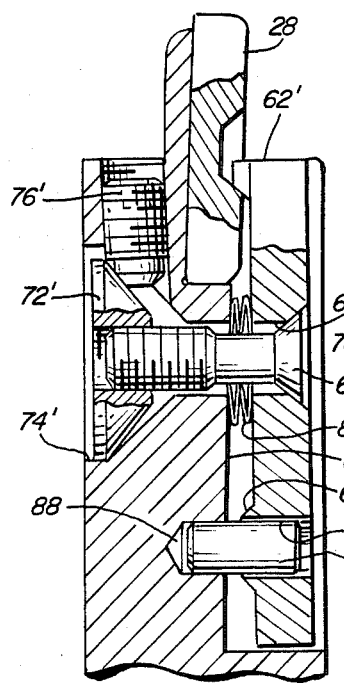
FIG. 9 is an enlarged fragmentary sectional elevation similar to FIG. 5, showing the latest preferred form of clamping device of the invention.
Figure 10:
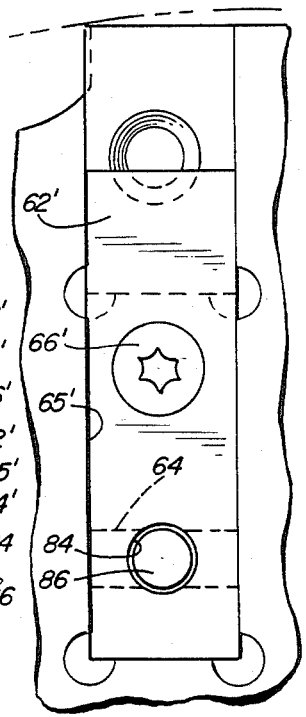
FIG. 10 is a fragmentary side elevation of the insert and clamping mechanism of FIG. 9.

Evolved from the initially developed form of the invention illustrated in FIGS. 2 to 4, inclusive, is the less costly and preferred form of the clamp mechanism 60 illustrated in FIGS. 5 to 8, inclusive, and, as further modified, in FIGS. 9 and 10.

The clamping detent 62 takes the more conventional form of a holddown clamp, the inner surface of which is recessed to provide a protruding fulcrum 64 at the radially inner end of the detent about which the detent may pivot slightly against the bottom of its host slot 65 in the cutter body when drawn axially by a countersink-head 66 connecting screw passed through a countersunk clearance hole 68 in the center of the detent. The screw also extends through an axiallyparallel clearance hole 70 in the cutter body to be received in the tapped central hole of a retainer disk 72 seated in a bore 74 in the opposite face of the cutter.

A headless, conically pointed socket screw 76 enters the bore from its radially outward side through a tapped hole radially accessible from outside the ganged cutter bodies, and is opposed by a conically headed locator pin 78 seated in an extension of the screw hole on the opposite side of the bore 74 which receives the retainer disk 72. The retainer disk 72 itself is provided on its inner face with diametrically opposite V-shaped grooves 80 which receive the opposed conical points of the locator pin 78 and adjusting screw 76 so that, as the adjusting screw is turned radially inwardly, the insert-clamping detent 62 is drawn axially inwardly of the cutter body, rocking about the floating fulcrum 64 at the end of the detent opposite the nose which engages the insert.

As in the clamping detent of FIGS. 2 to 4, the engaging nose of the clamping detent 62 is formed on its underside to conform to the conical surface of the clamp-receiving depression in the face of the insert, and the radial reaction to the clamping forces are resisted by the engagement of the shank of the connecting screw 66 with the wall of the clearance hole 70 in the cutter body.

The release of the detent 62 from clamping engagement with the insert 28 is affected by a compression spring 82, illustrated as a stack of Belleville washers, which surrounds the shank of the connecting screw 66, bearing at one end upon the innerside of the detent 62 and being seated at its opposite end against the cutter body.

As in the case of the initially developed form of FIGS. 2 to 4, inclusive, the term "radial" is used advisedly in describing the orientation of those elements of the clamping mechanism described as oriented "radially", inasmuch as they depart angularly therefrom agreeably to the aforedescribed cutting insert, which, as already explained, is positioned to provide clearance behind its cutting edges.

In the further modification of the preferred form of the insert clamping mechanism illustrated in FIGS. 9 and 10, the same clamping principles are employed somewhat differently in that the clamping detent 62' at the point of its fulcrum 64' against the bottom surface of its host slot 65' is provided with a through clearance hole 84 which loosely receives a dowel pin 86 driven into a hole 88 drilled in the cutter body perpendicular to the floor of the host slot 65'. The fit of the anchoring dowel pin within the clearance hole 84 of the detent is sufficiently loose to permit several angular degrees of rocking motion of the detent 62' about the fulcrum, and for that purpose the clearance hole 68' in the detent 62' and in the cutter body for the connecting screw 66' are made somewhat larger relative to the shank of the screw to permit the latter to rock as well in accommodation to the rocking of the clamping detent 62'.

In this modification of the preferred form, the retainer disk 72' is conical rather than cylindrical, and the bore 74' in which the retainer disk is seated is also conical in part, with a somewhat larger base cone diameter, from which the bore is cylindrical out to the face of the cutter body.

Figure 7:
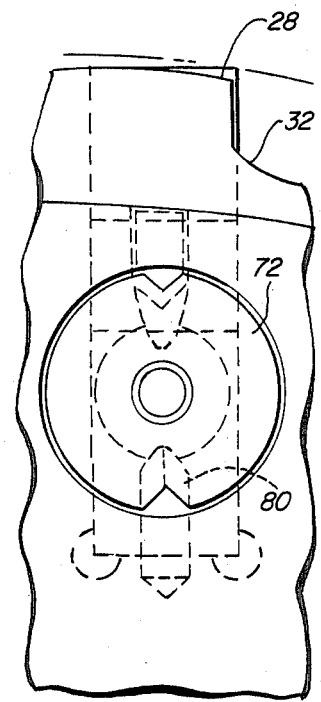
FIG. 7 is the opposite side elevation of the clamping mechanism and insert of FIG. 5.
Figure 5:
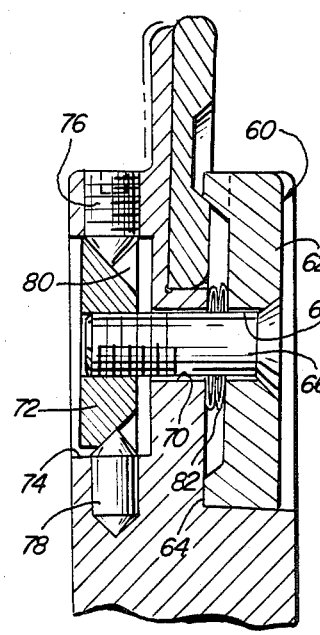
FIG. 5 is an enlarged fragmentary sectional elevation similar to FIG. 2, but showing the preferred form of clamping device of the invention in association with the novel insert of the invention.
Figure 6:
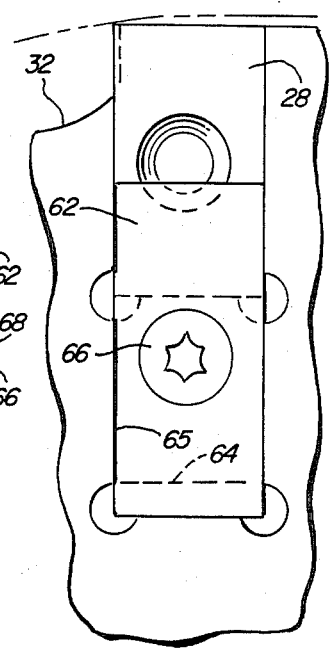
FIG. 6 is a fragmentary side elevation of the insert and clamping mechanism of FIG. 5.
Figure 8:
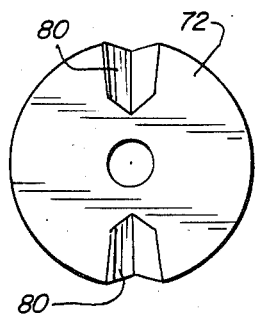
FIG. 8 is an isolated elevational view of the retainer disk seen in FIGS. 5 and 7, constituting a part of the preferred clamping mechanism.

As with the form of FIGS. 5 to 7, the connecting screw 66' is seated in a tapped hole in the center of the retainer disk 72', which is preferably provided with a kerf or the like to hold the same for the threading of the connecting screw 66', which preferably has an interference fit with the threads of the hole in the disk in order to maintain any desired adjustment.

In the modified preferred form of FIGS. 9 and 10, the locator pin of FIGS. 5 to 7, inclusive, which opposes the adjusting screw 76, is omitted inasmuch as the conical point of the adjusting screw 76' forces the retainer disk downwardly as well as to the left in FIG. 9, ultimately anchoring the conical surface of the retainer disk 72' against the shoulder provided by the base of the conical counterbore 74'. A compression spring 82' surrounding the shank of the connecting screw 66' between the clamping detent 62' and the floor of its host slot 65' provides the force to move the detent out of clamping engagement with the insert when the adjusting screw 76' is backed off to free the nose of the clamping detent from its mating depression in the face of the insert.

It will be apparent by a comparison of FIGS. 5 and 9 that the conical form of retainer disk 72' of FIG. 9 is equally substitutable in the form of FIG. 5.

The Cutting Inserts Per Se

The inserts 28 and 28' illustrated in FIGS. 11 to 15, inclusive, are designed for use in the slotting context as roughing inserts, and are believed unique in their provisions for engagement with the clamping detents of the clamping device of the invention.

The inserts themselves are relatively thin to allow for the cutting of relatively narrow slots or grooves, and, for the sake of the integrity of the insert under the shock and heat of the cutting loads, are not provided with a through hole, as is common in the case on on-edge inserts, but rather with a blind depression for engagement by the clamping detent, which draws the insert radially inwardly against the locator surfaces of the insert pocket while clamping the insert solidly to the seating surface of the pocket on the side of the insert opposite the clamping detent.

To provide clamping forces of such direction and function, the blind depression 90 in the face of the insert 28 is preferably sloped and conveniently conical, as indicated in FIGS. 11 to 13 in the case of inserts of moderate length in the radial direction. In inserts 28' adapted for the milling of deeper slots, that is, where the insert is necessarily further elongated in the generally radial direction, the depression 90' in the clamping face of the insert is elongated into a modified oval form with half-conical ends conformable equally to the formed nose of the same clamping detent.

Notwithstanding the considerable radial extension of both forms of insert beyond the clamping detent, the preservation of the insert material in the central area of the insert by omitting a through-hole for clamping purposes has successfully avoided the fracture of the inserts in the heavy duty of rough cutting.

The insert 92 of FIGS. 17 to 19 is comparable to the insert of FIGS. 11 to 13 in that the blind depression 94 for the receipt of the nose of the clamping detent is conically shaped, but as the insert 92 is intended for the lighter duty of finish cutting, both major faces of the insert are indented with a conical depression 94, and all four corners 96 of the rake faces of the insert are provided with the slotbottoming corner radius to provide each insert with eight cutting edges, four of which are available by indexing the insert in pockets on the right side of the cutter body, and the other four with the insert on the left side of the cutter.

With the lesser cutting loads and stresses upon the inserts in this lighter finishing duty, the loss of cross-sectional area from the second side of the insert is not detrimental inasmuch as the residual web between the depressions 94 has proved adequate, while the availability of eight cutting edges, instead of the four available for roughing, is a considerable cost advantage.

In the same manner, the double depression allowable for the finishing insert 92 is equally adaptable to the elongated clamping depression of those inserts designed for cutting deeper slots, the finishing inserts 92' of FIGS. 20 to 22 being the counterparts of the elongated roughing inserts of FIGS. 14 to 16, inclusive.

The features of the clamping devices and inserts of the invention believed new and patentable are set forth in the appended claims.

What is claimed is:

1. In a slot milling cutter having a flat circular body with a central peripheral ridge narrower than the slot to be milled, and pockets on the sides of said ridge and cutter body to receive replaceable on-edge cutting inserts protruding from said pockets radially and axially of said ridge, said cutter body being adapted to be ganged with multiple such cutters in facing contact on a common rotational axis for the simultaneous milling of multiple slots in a workpiece, a clamping mechanism for each such insert pocket comprising a detent in the form of an arm extending generally radially within a recess in the body of the cutter and having thereon a protrusion insertable into a depression formed in the outer axially facing surface of an insert seated in said pocket, an adjusting screw extending generally radially into the cutter body on the side of said ridge opposite the detent arm, and means in the path of said screw connected to said detent arm and operable by the engagement of said screw therewith when the screw is advanced into the cutter body to move said detent arm axially of the cutter body into clamping engagement with an insert in the associated pocket.

2. The subject matter of claim 1 wherein the protrusion on the detent is sloped on its underside to provide axial clamping force with a radially inward component as said detent arm is moved axially by the advance of the adjusting screw to clamp the insert into its pocket.

3. The subject matter of claim 2 wherein the sloped undersurface of the protrusion is conical.

4. The subject matter of claim 1 wherein the detent arm is one arm of a bell crank lever pivoted within said recess on an axis transverse to the rotational axis of the cutter body and the other arm of said bell crank extends through a clearance hole extending through the cutter body axially thereof and into the path of said adjusting screw to be engaged by the advancing screw to rock the detent arm about its pivot to cause said protrusion to enter and engage the surface of the depression in the insert.

5. The subject matter of claim 4 wherein said other arm of the bell crank is engageable on its opposite side by spring means opposing the rocking of said other arm by the advance of the adjusting screw, and which serves to rock the detent arm oppositely to disengage the protrusion thereof from the insert as the adjusting screw is backed off.

6. The subject matter of claim 5 wherein said bell crank lever is pivoted on a pin in a separate frame inserted into said recess as a subassembly and removably secured therein.

7. The subject matter of claim 1 wherein the detent arm at its end opposite the insert-engaging protrusion thereof is formed as a fulcrum bearing upon the wall of said recess, and said means in the path of the adjusting screw and connected to the detent arm comprise a disk loosely seated in an axially parallel bore in the cutter body on the side thereof opposite said recess and a connecting screw passed through the detent arm midway thereof and through a clearance hole in the cutter body between said recess and said bore, said connecting screw being anchored in a tapped hole in the center of said disk, said disk having a sloped camming surface disposed in the line of the adjusting screw and adapted to tension the connecting screw when the adjusting screw is screwed into the cutter body, thereby to draw the detent arm axially of the cutter into said clamping engagement.

8. The subject matter of claim 7 wherein a spring is interposed between the detent arm and the cutter body within said recess to oppose the clamping movement of the detent arm so as to disengage the same from the insert when the adjusting screw is backed off.

9. The subject matter of claim 8 wherein the spring is a Belleville compression spring surrounding the shank of the connecting screw.

10. The subject matter of claim 7 wherein a conically pointed pin seated in the cutter body protrudes into said bore in diametrical opposition to said adjusting screw and likewise engages a sloped camming surface on the diametrically opposite side of said disk to act cooperatively with the adjusting screw to tension said connecting screw when the adjusting screw is tightened.

11. The subject matter of claim 7 or 10 wherein the disk is conical on its inwardly facing side to provide said sloped camming surface.

12. The subject matter of claim 7 wherein the disk is conical on its inwardly facing side to provide said sloped camming surface, the bottom of said bore is also conical with a larger base diameter than that of said disk, the clearance hole in the cutter body for the connecting screw allows lateral and tilting movement of the connecting screw, and the fulcrum end of the detent arm is restrained against radially outward movement by a pin passed loosely through the detent arm into the cutter body.

13. The subject matter of claim 12 wherein each of the cutting inserts comprises a block of cutting material in the form of a flat, elongated parallelepiped both of whose elongated minor surfaces are rake faces and whose shorter minor surfaces are clearance faces behind the cutting tips of said rake faces respectively, and one of whose major faces constitutes the insert seating face while the opposite major face is the clearance face behind an elongated cutting edge of each of said rake faces, at least said opposite major face having formed therein a blind depression to receive the protrusion of said detent arm, said depression having outwardly diverging sloped sidewalls adjacent said shorter minor surfaces.

14. The subject matter of claim 13 wherein each major face of the insert has such a blind depression, and the depressions are in registry and have a residual web of material between them.

15. The subject matter of claim 7 wherein each of the cutting inserts comprises a block of cutting material in the form of a flat, elongated parallelepiped both of whose elongated minor surfaces are rake faces and whose shorter minor surfaces are clearance faces behind the cutting tips of said rake faces respectively, and one of whose major faces constitutes the insert seating face while the opposite major face is the clearance face behind an elongated cutting edge of each of said rake faces, at least said opposite major face having formed therein a blind depression to receive the protrusion of said detent arm, said depression having outwardly diverging sloped sidewalls adjacent said shorter minor surfaces.

16. The subject matter of claim 15 wherein each major face of the insert has such a blind depression, and the depressions are in registry and have a residual web of material between them.

17. The subject matter of claim 1 wherein each of the cutting inserts comprises a block of cutting material in the form of a flat, elongated parallelepiped both of whose elongated minor surfaces are rake faces and whose shorter minor surfaces are clearance faces behind the cutting tips of said rake faces respectively, and one of whose major faces constitutes the insert seating face while the opposite major face is the clearance face behind an elongated cutting edge of each of said rake faces, at least said opposite major face having formed therein a blind depression to receive the protrusion of said detent arm, said depression having outwardly diverging sloped sidewalls adjacent said shorter minor surfaces.

18. The subject matter of claim 17 wherein each major face of the insert has such a blind depression, and the depressions are in registry and have a residual web of material between them.

* * * * *